(12) United States Patent
Jones

(10) Patent No.: US 9,385,513 B2
(45) Date of Patent: Jul. 5, 2016

(54) CABLE POSITIONING ARRANGEMENT

(76) Inventor: Warren Nigel Jones, Bath (GB)

( * ) Notice: Subject to any disclaimer, the term of this patent is extended or adjusted under 35 U.S.C. 154(b) by 250 days.

(21) Appl. No.: 13/516,184

(22) PCT Filed: Dec. 6, 2010

(86) PCT No.: PCT/GB2010/052026
§ 371 (c)(1),
(2), (4) Date: Jun. 14, 2012

(87) PCT Pub. No.: WO2011/073636
PCT Pub. Date: Jun. 23, 2011

(65) Prior Publication Data
US 2012/0298596 A1    Nov. 29, 2012

(30) Foreign Application Priority Data

Dec. 16, 2009    (GB) .................................. 0921979.1

(51) Int. Cl.
| | | |
|---|---|---|
| H02G 1/00 | (2006.01) | |
| H02G 3/30 | (2006.01) | |
| H02G 3/12 | (2006.01) | |

(52) U.S. Cl.
CPC ................ *H02G 1/00* (2013.01); *H02G 3/125* (2013.01); *H02G 3/30* (2013.01); *Y10T 29/49826* (2015.01); *Y10T 29/49874* (2015.01)

(58) Field of Classification Search
CPC ............ H02G 1/00; H02G 3/125; H02G 3/30
USPC .................... 248/56, 57, 49, 65, 58, 60, 68.1; 174/72 A; D8/356
See application file for complete search history.

(56) References Cited

U.S. PATENT DOCUMENTS

| | | | |
|---|---|---|---|
| 886,634 A * | 5/1908 | Pleister | 248/61 |
| 3,508,730 A | 4/1970 | Knezo | |
| 4,159,394 A * | 6/1979 | Ross | 174/72 TR |
| 4,366,939 A * | 1/1983 | McMillan | 248/68.1 |
| 4,579,310 A | 4/1986 | Wells et al. | |
| 4,874,908 A * | 10/1989 | Johansson | 174/72 A |
| 4,909,461 A | 3/1990 | Collins | |
| 4,990,098 A * | 2/1991 | Neidecker et al. | 439/207 |
| 5,060,892 A * | 10/1991 | Dougherty | 248/57 |
| 5,283,931 A | 2/1994 | Oetiker | |
| 6,012,685 A | 1/2000 | Saraceno | |
| 6,140,584 A * | 10/2000 | Baldissara | 174/68.3 |
| 6,202,962 B1 | 3/2001 | Snyder | |
| 6,417,451 B1* | 7/2002 | Uchiyama | 174/72 A |
| 6,467,734 B1 | 10/2002 | Brown et al. | |
| 6,796,335 B1* | 9/2004 | Hubbard et al. | 138/106 |
| 6,930,244 B1 | 8/2005 | Nebel | |
| 6,959,898 B1* | 11/2005 | Laughlin et al. | 248/60 |
| 7,216,678 B2* | 5/2007 | Baer | 139/384 R |

(Continued)

FOREIGN PATENT DOCUMENTS

| | | |
|---|---|---|
| AU | 2002100437 | 6/2002 |
| CN | 201256274 | 6/2009 |

(Continued)

*Primary Examiner* — Joshua Rodden
(74) *Attorney, Agent, or Firm* — Hamre, Schumann, Mueller & Larson P.C.

(57) ABSTRACT

A cable positioning arrangement comprises a flexible member, such as an elastic band or cord, extending between two structures. The flexible member is associated with a hole through which a cable passes thereby positioning the cable relative to the structures.

10 Claims, 9 Drawing Sheets

(56) References Cited

U.S. PATENT DOCUMENTS

| | | | |
|---|---|---|---|
| 7,282,646 B2* | 10/2007 | Neujahr | 174/135 |
| 7,434,770 B2* | 10/2008 | Schmidt | 248/49 |
| 7,459,636 B2* | 12/2008 | Conrad | 174/135 |
| 7,926,765 B1* | 4/2011 | Brown et al. | 248/57 |
| 2001/0019094 A1 | 9/2001 | Koziol | |
| 2002/0170149 A1 | 11/2002 | Severson | |
| 2005/0189453 A1* | 9/2005 | DeGuevara | 248/68.1 |
| 2005/0251967 A1 | 11/2005 | McNeill | |
| 2007/0158505 A1 | 7/2007 | Bitsack | |
| 2007/0246613 A1* | 10/2007 | Kennedy | 248/56 |
| 2009/0065249 A1* | 3/2009 | Silvers | 174/72 A |
| 2010/0181438 A1* | 7/2010 | Chauzu et al. | 248/49 |

FOREIGN PATENT DOCUMENTS

| | | |
|---|---|---|
| DE | 202004007294 | 7/2004 |
| DE | 202005011490 | 12/2006 |
| GB | 698696 | 10/1953 |
| GB | 1382905 | 2/1975 |
| GB | 1521897 | 8/1978 |
| GB | 2046597 | 11/1980 |
| GB | 2210914 | 6/1989 |
| GB | 2407923 | 5/2005 |
| GB | 2451422 | 2/2009 |

* cited by examiner

CABLE POSITIONING ARRANGEMENT

TECHNICAL FIELD

The present invention relates to a cable positioning arrangement and a method of positioning a cable.

BACKGROUND OF THE INVENTION

During construction of a building, cables are positioned into the areas needed for electrical fittings such as switches, sockets, ceiling pendants, downlighters and alike. Cables are typically left hanging in approximately the right place by the electricians, especially for what are commonly known as "fast-fix" installations, or flush mounted fittings such as downlighters. For example, the electrician may leave a cable hanging between stud uprights or ceiling joists, for subsequent attachment to an electrical fitting. A covering (for example plaster board) for the wall or ceiling is typically installed by a different operative (for example a plasterer or plaster boarder). When the operative installs the covering they are also required to make holes in the covering and pull the cable through in the required position.

It is difficult to ensure the correct position of the cable is maintained once it has been left close to the required position by the electrician; the plasterer often makes a hole and pulls the cable through in the wrong place. The electrician will typically be in charge of installing the electrical fitting to the cable, and if the cable has been pulled through in the wrong position, the electrician may have to make a second or third hole in the covering and re-thread the cables into the correct position. This increases the time and cost of manufacturing the building.

In some circumstances, the electrician may install a noggin (for example a piece of wood) between the studs or joists. The noggin may be used to better position the cable, but tends to be time consuming to install and wasteful of materials, and is therefore costly. GB 2210914 describes a replacement for a noggin in the form of a special wooden support located on nail plates than can be attached to wooden joists. However, the wooden support of GB 2210914 may be difficult to install and may only be useable for specific geometries. Both a noggin and the support in GB 2210914 tend not to be appropriate for "fast-fix" installations.

The difficulty of positioning cables is also an issue in other industries or applications. For example, electrical apparatus requiring a multiplicity of cables, such as computer servers, or televisions, are often associated with a complicated and untidy collection of input and output cables. By way of some another examples, automotive or aerospace products may also include many different cables. In all the aforementioned examples, it is desirable to position these cables in an improved manner. Arrangements have been suggested in which cables are positioned using solid structures that hold the cables in the required position. These structures tend to be cumbersome and can obstruct access to other areas.

SUMMARY OF THE INVENTION

The present invention seeks to mitigate or remove at least one of the above-mentioned problems. The present invention seeks to provide an improved arrangement for positioning cables.

The present invention provides a cable positioning arrangement comprising a flexible member extending between two structures, the flexible member being associated with a hole through which a cable passes thereby positioning the cable relative to the structures. Using a flexible member tends to enable a number of advantages. For example, a flexible member may be quickly and easily fixed in and out of position, or temporarily moved out of position, thus not causing an obstruction, a flexible member tends to be less voluminous than, for example a wooden noggin, and a large length of flexible member may be easily transportable.

The flexible member is preferably non-rigid. The flexible member may be non-self-supporting. The flexible member may be distortable under the application of a force and sufficiently flexible to remain in its distorted position when the force is removed. It will be appreciated that reference to a flexible member (and to the properties of that flexible member) are made in respect of the member itself and not necessarily is respect of the member when located between the structures. For example the flexible member may be a flexible cord that, when extended between the structures, is under sufficient tension that it is rigid and self-supporting.

The flexible member may have an additional element associated therewith, which defines the hole. For example, a peg, or clip may be attached to the flexible member, the peg or clip having a hole therein through which the cable passes. More preferably, the hole is defined by the flexible member itself. For example, the hole may be defined by a loop of the flexible member. Such an arrangement is especially suitable where the flexible member is a thin cord or alike.

Yet more preferably, the hole is a hole through the flexible member. This may be a relatively cheap and uncomplicated arrangement. Such an arrangement is especially suitable where the flexible member has significant width (for example where the flexible member is a band). The hole preferably passes through the flexible member from one side to another.

In preferred embodiments of the invention, the flexible member is a band. A band is readily identifiable to the skilled person. For the sake of clarity some typical characteristics of a band are: it may be wider than it is deep and longer than it is wide; it is flexible; it tends to be able to support tensile loads, but may be unable to support compressive loads; it can be elastic but need not necessarily be so; and it can be a closed loop or have free ends.

The hole need not necessarily be circular, and may in fact be any form of opening through which the cable passes. The hole preferably has rounded edges.

The cable may be for any number of uses. For example, the cable may be an electrical supply cable, a telecoms cable, a fibre optic cable, a data cable etc.

The flexible member preferably contacts the cable as it passes through the hole, and more preferably the flexible member may be arranged to support the cable as it passes through the hole. The hole may be sufficiently large to receive the cable, but sufficiently small to allow the surrounding flexible member structure to support the cable (for example the cable may pass through the hole in a close fit).

The flexible member may be under tension. Having the flexible member under tension tends to give it improved structural rigidity. The position of the hole (and thus the cable) may therefore be more stable. The flexible member may be elastic. It will be appreciated that an elastic flexible member not only covers embodiments in which the flexible member is made purely from an elastic material, but also encompasses embodiments in which the flexible member comprises an elastic portion such that the flexible member is elasticated. The flexible member may be elastically extended between the two structures. An elastic flexible member tends to be easily put under tension during installation. The elastic flexible member may have a relatively low elastic modulus. An elastic flexible member may also be advantageous because it can take up relatively little space when not under tension. Thus, when the cable no longer needs to be positioned (for example after a plaster board has been installed in an embodiment in a stud wall), or when the flexible member will interfere with another fitting, the flexible member may be cut, allowing it to contract back to a relatively short, unloaded, state. An elastic flexible member may also be readily pulled out of the way if necessary (for example to access something close to the flexible member).

The flexible member is preferably attached to one, or more preferably both, the structures. The flexible member may be attached to at least one of the structures by a fastener. For example, the flexible member may be nailed, or stapled, to the structures. One or more fasteners may be supplied with the flexible member. The fasteners may be releasably fitted onto the flexible member for ease of access for the user.

The flexible member may be attached to at least one of the structures by adhesive. The flexible member may have an adhesive backing. The flexible member may comprise a removeable layer covering the adhesive. Adhesive pads may be supplied separately and the flexible member (which may itself be non-adhesive) may be attached to the adhesive pads.

One of the structures may comprise a hook. The flexible member may be mounted on the hook. The hook may be arranged to pierce the flexible member. The flexible member may include a hole for mounting onto the hook. Alternatively or additionally, an edge of the flexible member may comprise a cut-out for receiving the hook. The hook may be an integral part of the structure, but is more preferably mounted on the structure. The flexible member may be attached to a bracket mounted on the structure. The hook may be part of the bracket. The flexible member may be supplied with one or more brackets to facilitate easy installation.

The user may create the hole in the flexible member. For example the hole may be created by the user pressing the cable through a band or forming a hole by manipulating a thin flexible cord. The flexible member may comprise a perforated, or otherwise weakened area, to facilitate creation of the hole. Preferably, the hole is pre-formed in the flexible member. Embodiments of the invention may have particular layouts of holes, to facilitate arrangement of the cable(s). Embodiments in which the flexible member is a band are especially suitable for having layouts of a plurality of holes as the width of the band may allow holes to be positioned in a plurality of locations in the band.

The arrangement may comprise a hole of a first size and a hole of a second size. The cable may be of a first diameter and the hole may be of a first size for receiving the cable. The arrangement may further comprise a hole of a second size for receiving a cable of a second diameter. The term 'diameter' does not necessarily imply the cable is of circular cross-section and may, in fact relate to the maximum width of a non-circular cross-section cable. A cable of a second diameter may be received in the hole of the second size.

The first and second sizes of hole are preferably different. The holes may be of different shape. More than one cable may pass through the same hole. The holes may be of a first size for receiving a plurality of cables of the first diameter, and of a second size for receiving a plurality of cables of the second diameter. It will be appreciated that the hole, or holes, need not necessarily be circular and may be any shape that forms an opening.

The flexible member may include indicators for identifying the holes (for example the holes may be numbered). The indicators may be arranged to identify the longitudinal and/or lateral position of the hole. Such an arrangement facilitates fast and correct identification of the hole through which the cable should be passed.

The hole of the first size may be adjacent to the hole of the second size. The holes may be arranged across the width of the flexible member. The holes may be arranged in a line across the width of the flexible member. The line of holes may extend perpendicular to the length of the flexible member. The line of holes may extend at 45 degrees to the length of the flexible member.

The arrangement may comprise a multiplicity of holes arranged along the length of the flexible member. In an embodiment in which the flexible member comprises holes of first and second sizes, the flexible member may comprise a multiplicity of holes of the first size arranged along the length of the flexible member, and a multiplicity of holes of the second size arranged along the length of the flexible member. The holes may be arranged in a continuously repeating sequence.

The flexible member may comprise fastener holes for facilitating attachment of the flexible member to the structures. The hole(s) may be arranged to receive a fastener, for example a nail, screw or staple. The fastener holes are preferably arranged at the edge of the flexible member. The fastener holes are preferably of a third size. The fastener may be received through the fastener hole.

In embodiments of the invention in which the flexible member is under tension, and particularly in embodiments where the flexible member is an elastic band, the band may suffer from distortion (particularly a loss of width, for example through necking of the band and/or lateral roll up of the band) when it is extended between the two structures. The flexible member may comprise stiffening elements arranged to inhibit a reduction in the width of the flexible member when the flexible member is under tension. The stiffening elements may be in a number of forms. The stiffening elements preferably comprise ribs extending across the width of the flexible member. For example, the flexible member may comprise a multiplicity of regularly spaced ribs running perpendicular to the length of the flexible member. The ribs may resist compression and/or bending along their length and therefore act to inhibit a reduction in the width of the flexible member, at least at the location of the ribs, when the flexible member is under tension. In another embodiment of the invention the flexible member may comprise a multiplicity of lateral folds. The folds in the flexible member tend to resist compression and bending along their length and therefore act to inhibit a reduction in the width of the flexible member, at least at the location of the folds, when the flexible member is under tension. The flexible member may be concertina shaped. The flexible member may comprise a combination of different stiffening elements (for example the two types of stiffening element described above).

The hole may generate a stress concentration in the flexible member. It is desirable to prevent the flexible member splitting at these stress concentrations. The flexible member may comprise a reinforcement element running along the length of the flexible member to inhibit lateral splitting of the flexible member. The reinforcement element may comprise a multiplicity of discrete parts, but is preferably continuous. The reinforcement element is preferably arranged to inhibit any tears in the flexible member from spreading across the element. The reinforcement element may, for example, be a fibre running along the length of the flexible member. The flexible member may comprise a multiplicity of parallel reinforcement elements running along the length of the flexible member.

The flexible member may comprise reinforcement elements running across the width of each flexible member to inhibit longitudinal splitting of the flexible member. The reinforcement element may comprise a multiplicity of discrete parts, but is preferably continuous. The reinforcement element is preferably arranged to inhibit any tears in the flexible member from spreading across the element. The reinforcement element may, for example, be a fibre running across the width of the flexible member. The flexible member may comprise a multiplicity of parallel reinforcement elements running across the width of the flexible member.

The flexible member may comprise both the above-mentioned reinforcement elements (running along the length and across the width of the flexible member). The reinforcement elements may run substantially perpendicular to one another.

An outer surface of the flexible member is preferably arranged to be able to be written on using an ink pen. The flexible member may be fire-resistant; this is especially beneficial when the flexible member is used in a construction environment.

The cable positioning arrangement may be used on a wide variety of structures. The two structures between which the flexible member extends, may be two different, discrete, structures but may equally be two parts of a greater monolithic body. The structures may, for example be opposite edges of a computer server housing or parts of a car engine bay. The structures may be adjacent studs in a stud wall. Embodiments of the invention are particularly advantageous in building structures. The structures may be building structures. For example the structures may be part of a wall, floor or ceiling. The structures may be joists. The structures may be studs (for example metal or wooden studs).

According to a second aspect of the invention, there is provided a flexible member suitable for use in the first aspect of the invention. The flexible member may comprise any or all of the features of the flexible member described with reference to the first aspect of the invention. The flexible member may be in discrete lengths to suit particular applications (for example 700 mm or 500 mm to fit, respectively, standard 600 mm and 400 mm widths between stud uprights and ceiling joists (with 100 mm excess length to spare)). The flexible member may be supplied in bulk form and cut to measure. The flexible member may be supplied in a roll. Such an arrangement is especially applicable when the flexible member is a band.

According to a further aspect of the invention there is provided a method of positioning a cable between two structures, the method comprising the steps of:

extending a flexible member between the two structures, and passing the cable through a hole associated with the flexible member thereby positioning the cable relative to the structures. The method may comprise the step of tensioning the flexible member. It will be appreciated that the step of tensioning the flexible member is typically applied at the same time the flexible member is positioned between the two structures, but may in some circumstances be applied after that step. For example, the flexible member may be arranged to shrink under application of heat, or the flexible member may be arranged to shrink under application of a particular chemical composition.

As described above, the flexible member may have a preformed hole, or the user may create the hole himself. The flexible member may have a marked area, such as a grid, identifying the area where holes can be made. The method may comprise the step of making the hole in the flexible member.

In embodiments in which the structures are part of a wall, floor or ceiling of a building, the method may comprise the step of installing a covering over the structures, forming a hole in the covering and drawing the cable through the hole in the covering.

In some circumstances, it may be desirable to remove the band after the cables have been positioned and any necessary measurements have been taken. The flexible member may be cut. In embodiments in which the flexible member is elastic, the flexible member will then be able to return to its, relatively small, unstretched state and will not take up significant room or form any obstruction.

According to a further aspect of the present invention, there is provided a cable positioning arrangement comprising a flexible member extending between two structures, and a locator means associated with the flexible member, the locator means being arranged to locate the cable relative to the structures. The locator means may comprise a holder for holding the cable. The holder may comprise resilient arms for gripping the cable. For example, the holder may be a peg mounted on the flexible member. The locator means may be a hole in, or otherwise associated with, the flexible member, through which the cable passes.

Any features described with reference to one aspect of the invention are equally applicable to any other aspect of the invention, and vice versa. For example, features relating to the first aspect, may be incorporated into the above-mentioned method. Unless otherwise specified, any feature described with reference to a band is equally applicable to a flexible member (and vice versa).

DESCRIPTION OF THE DRAWINGS

Various embodiments of the invention will now be described, by way of example only, with reference to the accompanying schematic drawings of which.

DETAILED DESCRIPTION

During construction of a building, cables are typically positioned into the areas needed for electrical fittings such as switches, sockets, ceiling pendants, down lighters and alike. In prior art methods, the cables are typically left hanging in approximately the right place by the electricians. For example, the electrician may leave a cable hanging between stud uprights or ceiling joists for subsequent attachment to an electrical fitting. The covering for the wall or ceiling is typically installed by a different tradesman (for example a plasterer). When the plasterer installs the covering they are often also required to make holes in the covering and pull the cable through in the required position.

It is difficult to ensure the correct position of the cable is maintained once it has been left in the approximate place by the electrician; the plasterer often makes a hole and pulls the cable through in the wrong place. The electrician will typically be in charge of installing the electrical fitting to the cable, and if the cable has been pulled through in the wrong position, the electrician may have to make a second or third hole in the covering and re-thread the cables into the correct position. This increases the time and cost of manufacturing the building.

Figure 1:
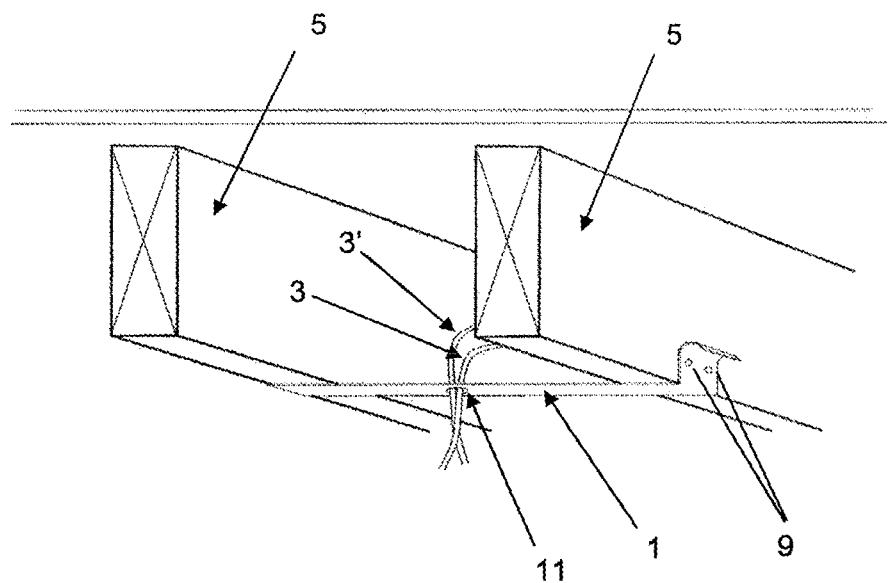
FIG. 1 is a perspective view of a cable positioning arrangement according to a first embodiment of the invention.

FIG. 1 is a perspective view of a cable positioning arrangement according to a first embodiment of the invention. The arrangement comprises a band 1, an electrical cable 3 and two parallel ceiling joists 5. The ceiling joists 5 are part of the ceiling of a building (not shown). The band comprises a central hole 11 through which the cable 3 passes. A second cable 3', of the same diameter, also passes through the hole 11.

By passing the cables 3, 3' through the hole in the tape, the position of the cables (at least where they pass through the hole) is thereby fixed, relative to the joists 5. Fixing the position of the cables relative to the joists is useful because it enables a ceiling panel fitter to correctly position a hole for the cables in the ceiling panel (not shown) when that ceiling panel is fitted to the ceiling.

The method of installing the band 1 and positioning the cables 3, 3' is described in detail below. As is known in the prior art, an electrician firstly installs cables 3, 3' in the ceiling structure and allows them to hang between the joists 5 in roughly the correct position. In this embodiment, the electrician requires the cables to exit the ceiling mid-way between the joists, so that the cables can be connected to a lighting fixture. In the first embodiment of the invention, adjacent joists are spaced apart by 600 mm (centre to centre), so the central cable position corresponds to a distance of 300 mm between the joists. In the prior art methods, the electrician may not be able to accurately position the cables. However, in accordance with the first embodiment of the invention, the electrician uses the band 1 to locate them in the correct position. The electrician fastens one end of the band 1 on one of the joists 5 using nails 9. He then pulls the band across to the other joist 5 and nails that end to the joist 5. The band is elastic and in pulling the band 1 across between the joists 5, the band 1 is elastically extended. In its unextended state the band 1 is around 500 mm long and the hole 11 is centrally positioned along the length of the band. When it is stretched to just over 600 mm (the distance between the joists plus some extra to accommodate the excess at either end), the hole 11 remains central since the band stretches evenly along its length and is attached to the joists at a similar distance from each end. The hole 11 is thereby positioned above where the cables 3, 3' should exit the ceiling. After installing the band 1, the electrician feeds the cables 3, 3' through the hole, thereby correctly positioning the cables in the joist void for the ceiling panel fitter.

Using a band 1 in order to position the cables 3,3' is quick and easy and does not use a significant number of materials. Furthermore, the band 1 is relatively thin and does not create an obstacle for the ceiling panel fitter. The band 1 itself is also easy to transport as it is thin, light and flexible. As the band is under tension when extended between the two structures, it is relatively rigid and is therefore able to provide a relatively stable support for the cables.

Once the ceiling panel fitter has created the hole in the ceiling panel, he feeds the cables through the panel. The electrician then returns to install an electrical fitting. In this embodiment of the invention, the electrician is installing a flush-fitting down-lighter (not shown). The housing of the downlighter will partially protrude into the joist void. To avoid interference with the band, the electrician cuts the band either side of the hole. Due to the elastic nature of the band, the band quickly contracts, thereby contracting away from the space the downlighter will occupy and a small, collar, of band may be left around the cables and this part of the band can be removed if deemed necessary.

The first embodiment of the invention uses a strip of band having a single central hole. However, other types of band may be used, and some further types of band are described below with reference to FIGS. 2a to 4b.

Figure 2A:
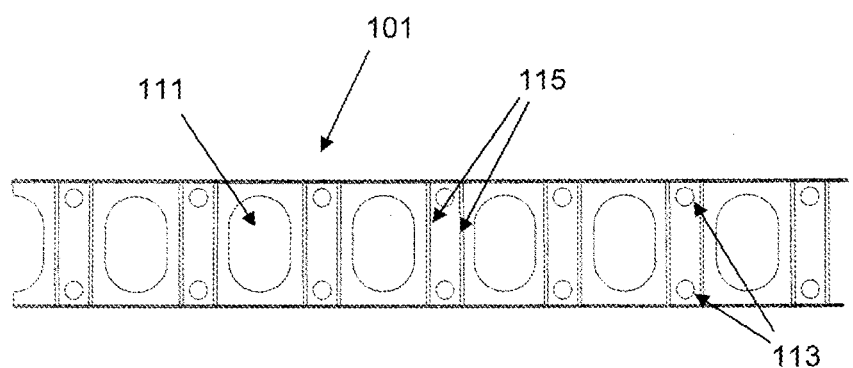
FIGS. 2a to 2e are views of five different bands according to further embodiments of the invention.

FIG. 2a is a plan view of a section of elastic band 101 according to a second embodiment of the invention. The band comprises a multiplicity of obround holes 111 regularly spaced in a line along the length of the band. Each hole 111 is able to receive several cables (not shown) simultaneously. The band is supplied in a roll and the user simply cuts the required length before attaching the band to a structure.

Having regularly spaced holes along the length of the band, enables the user to position different cables at different positions along the band 101 (and therefore at different positions between structures). It also means that the user does not need to ensure the single hole is a particular distance (for example half-way) along the band prior to attachment, as is the case in the first embodiment.

The band 101 includes pairs of small, fastener holes 113 located near the edge of the band, and between the large cable holes 111. The fastener holes 113 are arranged to be able to receive nails or screws, such that the user can fasten the band 101 to a structure by fixing these fasteners through the holes 113.

Either side of the fastener holes 113 are rubber stiffener ribs 115. The stiffener ribs 115 extend across the width of the band, perpendicular to the length of the band. The ribs 115 are made of rubber and inhibit a reduction in width of the band that might otherwise occur when the band is elastically extended (for example due to local necking, and/or lateral roll-up of the band). The ribs therefore assist in keeping the cable holes 111 accessible even when the band is stretched.

The band 101 is formed of a material that may be written on using a conventional ink pen. This enables a user to indicate which hole he would like the cable to be positioned through.

Figure 2B:
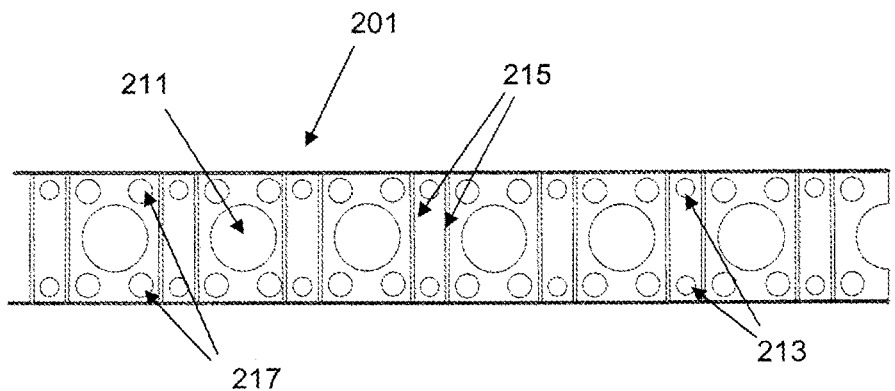

FIG. 2b shows a variation on the band of FIG. 2a. In this embodiment, the hand 201 comprises circular cable holes 211 of a first size arranged along the centre of the length of the band. The central cable holes 211 are adapted to receive electrical wiring cables (not shown). The central cable holes 211 are surrounded by two pairs of smaller circular cable holes 217. The smaller cable holes 217 are arranged to receive data cables which are of a smaller diameter than the electrical cables. The band 201 of the second embodiment of the invention may be especially useful in proximity to electrical apparatus requiring both these types of cable. For example, the band 201 shown in FIG. 2b may be attached between two structures near the back of a computer in order to neatly position the electrical and data cables to facilitate easy connection of the those cables to the back of the computer. The data cables may, of course, be passed through the larger cable holes 211, but are preferably passed through the smaller cable holes 217 as the band structure surrounding those holes supports the data cable because of its close fit.

Figure 2C:
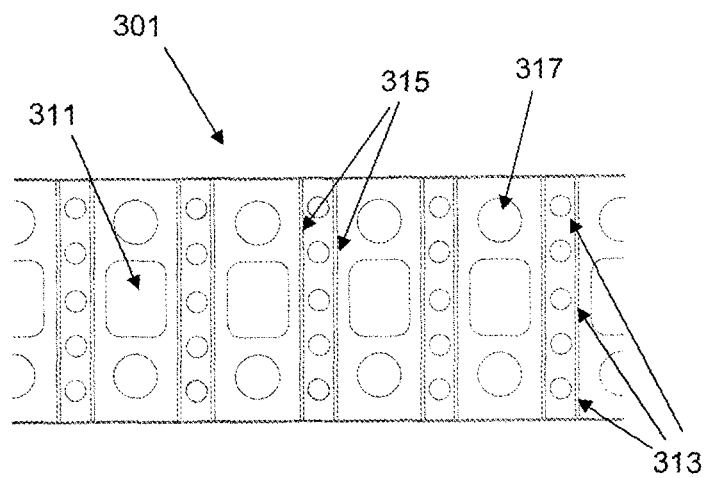

FIG. 2c shows a further variation of the band of FIG. 2a. In FIG. 2c, the band 301 comprises central rectangular holes 311. The rectangular holes have rounded corners to avoid stress concentrations in the band 301. The rectangular holes are arranged to receive circular, rectangular, or ribbon type cables. Either side of the rectangular holes 311 there are two smaller circular holes 317 for receiving small data cables. The band 301 further comprises fastener holes 313 located in columns of five, spread across the width of the band 301. This gives greater lateral adjustability in where to position the fastener(s) through the band. The band shown in FIG. 2c is wider than that of the embodiment in FIG. 2a.

Figure 2D:
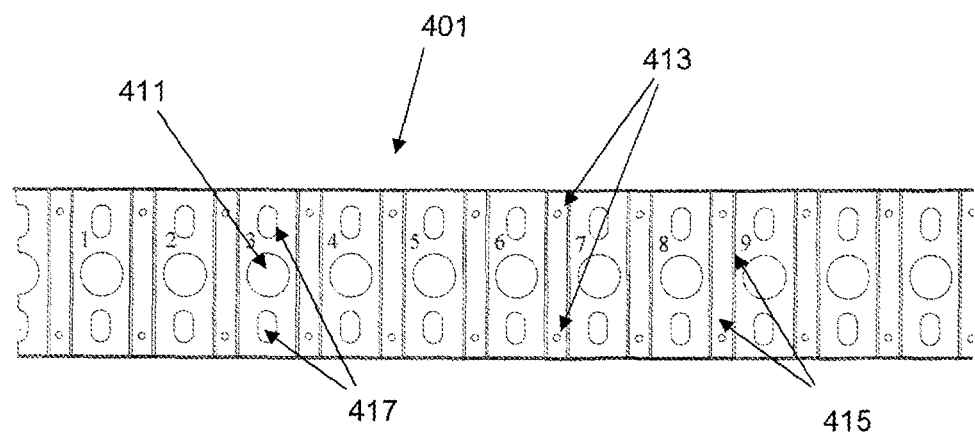

FIG. 2d shows yet another variation of the band of FIG. 2a. In this embodiment, the central cable holes 411 are circular and the adjacent holes are obround for receiving smaller cables. The fastener holes 413 are also smaller than in the embodiment of FIG. 2a and are adapted to receive a nail or screw in a tight fit. The fastener holes 413 facilitate easy insertion of the nail through the tape and are a sufficiently tight fit to ensure the band does not loosen after attachment to a structure. The central cable holes 411 are numbered one to nine (this sequence is repeated along the length of the band but is not shown in the interests of clarity). The numbering facilitates easy identification of the cable hole 411 through which the user would like the cable inserted.

The band 401 of FIG. 2d also has an adhesive backing to provide a secondary means of attachment to a structure in the event that a fastener is unsuitable (for example, the structure may be made of metal, or the band may be for attachment to furnishings, such as a desk or computer housing, which should not be damaged). The band comprises an adhesive layer underneath a removable backing layer. A portion of the removable backing layer can be removed at the part of the band that requires attachment to a structure.

Figure 2E:
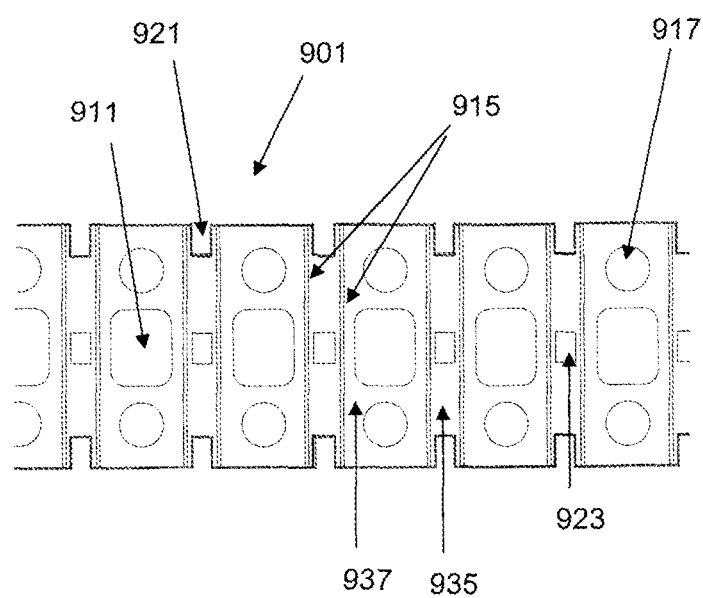

FIG. 2e shows a band according to yet another embodiment of the invention. The band 901 is identical to the band of FIG. 2c, except for two aspects: the fastener holes and the distribution of elastic material. In the embodiment of FIG. 2e, the band 901 comprises opposing rectangular cut-outs 921 in the edge of the band between the ribs 915, and mid-way between the two cut-outs 921 is a rectangular hole 923. The cut-outs 921 and rectangular hole 923 are arranged to receive three prongs of a hook (not shown). The band may be pulled over the hook under tension and inserted over the central prong of the hook once the band is correctly positioned. The two cut-outs fit the outer-most prongs of the hook and support the edges of the band 901. The hook may be part of the structures between which the band may be extended, or may be a bracket that is attachable to the structures before the band is applied.

In contrast to the embodiment of FIG. 2c, the embodiment of FIG. 2e comprises elastic regions and non-elastic regions. The region 935 between each pair of ribs 915 is fully elastic, allowing the band to stretch. The region 937 surrounding the cable holes 911 and 917 is substantially inelastic.

Figure 3A:
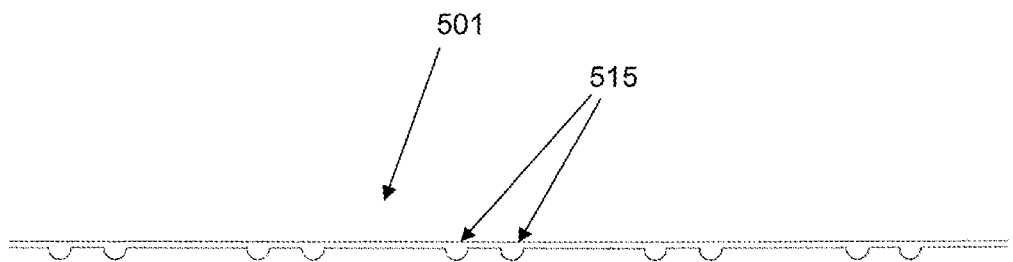
FIGS. 3a and 3b are side views of bands according to two further embodiments of the invention.
Figure 3B:
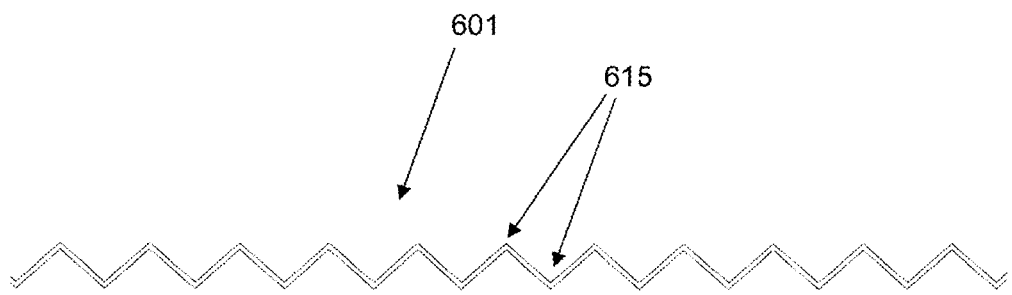

FIGS. 3a and 3b are side views of bands according to two further embodiments of the invention. Referring first to FIG. 3a, the band 501 comprises regularly spaced pairs of ribs 515 extending across the width of the band, parallel to the length of the band. It can be seen from FIG. 3a that the ribs are of semi-circular cylinders, and as with the embodiments of FIGS. 2a to 2e, the ribs are made of a rubber material. The ribs 515 enhance the stiffness of the band and inhibit roll-up or necking.

The band of FIG. 3b does not comprise any stiffening ribs, but instead comprises alternate folds 615 across the width of the band (the size of the folds 615 is exaggerated in FIG. 3b of ease of reference). The lateral folds 615 provide increased stiffness relative to an unfolded band, and inhibit a reduction in width of the band when it is under tension.

Figure 4A:
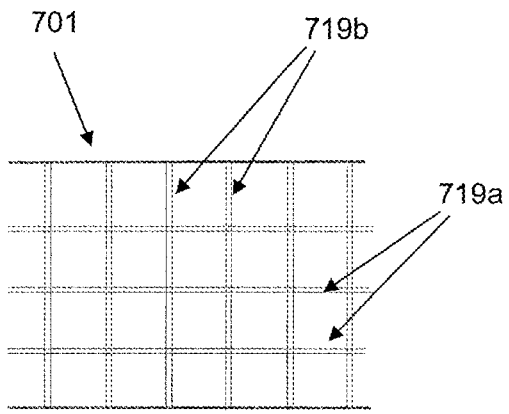
FIGS. 4a and 4h are schematic views of the bands of FIGS. 3a and 3b.
Figure 4B:
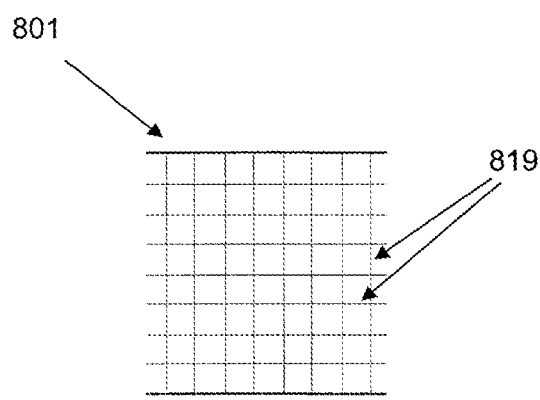

FIGS. 4a and 4b are schematic plan views of the bands of FIGS. 3a and 3b. FIG. 4a shows thick reinforcing elements 719 within the band 701. There are three reinforcing elements 719a running along the length of the band 701 and regularly spaced lateral reinforcing elements 719b (of identical construction to the longitudinal elements) running across the width of the band. The reinforcing elements 719 are located within the band structure, between the opposing outer surfaces, and FIG. 4a shows the outer surface of the upper side removed such that the reinforcing elements are visible. The reinforcing elements inhibit propagation of tears within the tape.

FIG. 4b is a variation of the tape of FIG. 4a. In this case, the reinforcing elements 819 are thinner, but more closely spaced.

Figure 5:
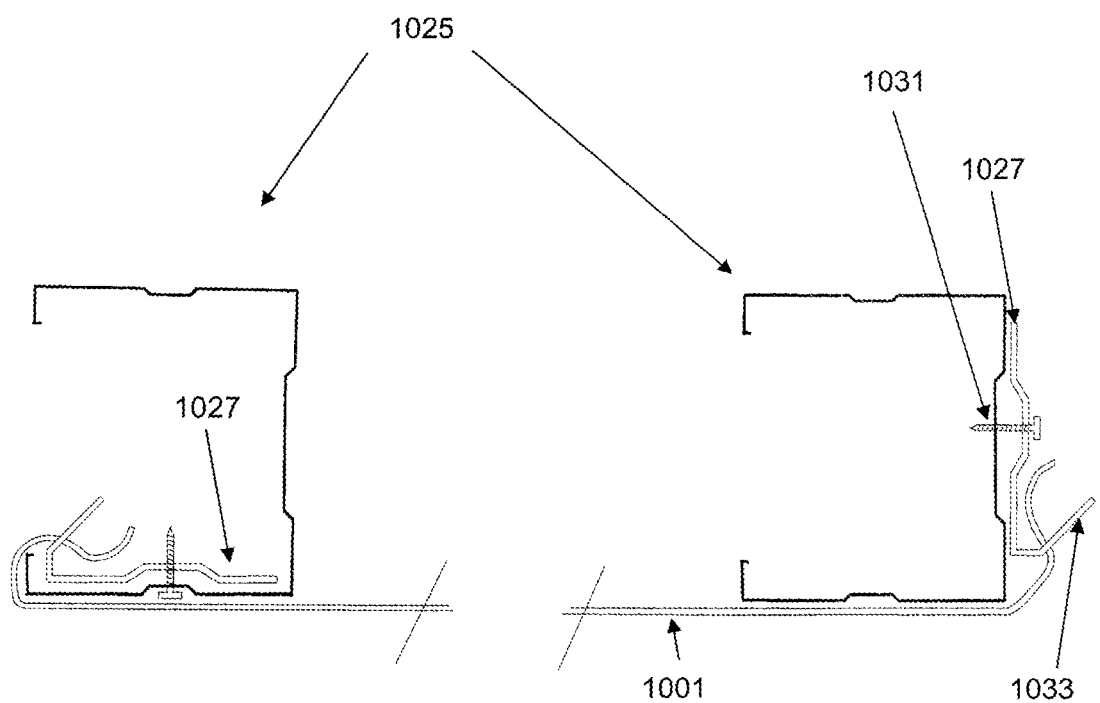
FIG. 5 is a sectional view through two studs in a cable positioning arrangement according to a further embodiment of the invention.
Figure 6A:
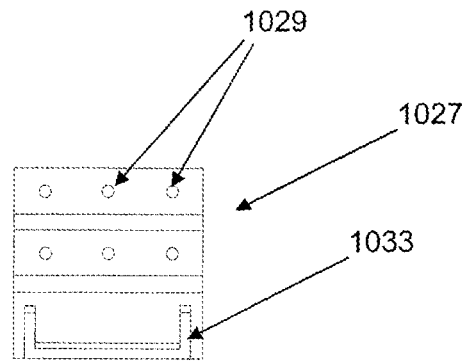
FIGS. 6a and 6b are views of a hooked bracket mounted on the studs of FIG. 5.
Figure 6B:
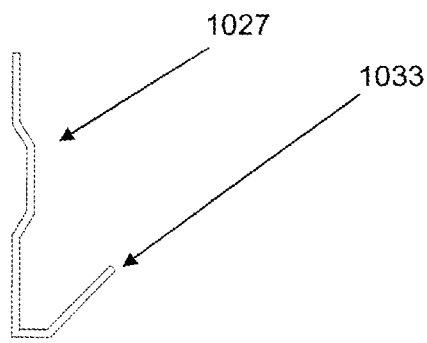

FIG. 5 is a sectional view through two common metal studs 1025 in a cable positioning arrangement according to a further embodiment of the invention. The studs are positioned in a wall (not shown) and run vertically upwards. A band 1001 is positioned between the studs and is attached to either stud 1025 via a bracket 1027. The bracket 1027 is shown in more detail in FIGS. 6a and 6b and comprises a sheet metal main body having holes 1029 through which a screw 1031 may be inserted to fix the bracket 1027 to the stud 1025. Extending away from the main body of the bracket 1027 is a two pronged hook 1033.

Referring back to FIG. 5, the band 1001 is received over the prongs of the hook 1033. The prongs are inserted through fastener holes (not visible in FIG. 5) in the band 1001. This arrangement provides an easily adjustable way of attaching the band between the studs. The band may be tensioned during attachment to the studs, by stretching it and pulling it over the hook. The band in the embodiment of FIG. 5 is also arranged to contract on application of heat. The band 1001 may therefore be tensioned after it has been attached to the hook by heating the band.

Figure 7:
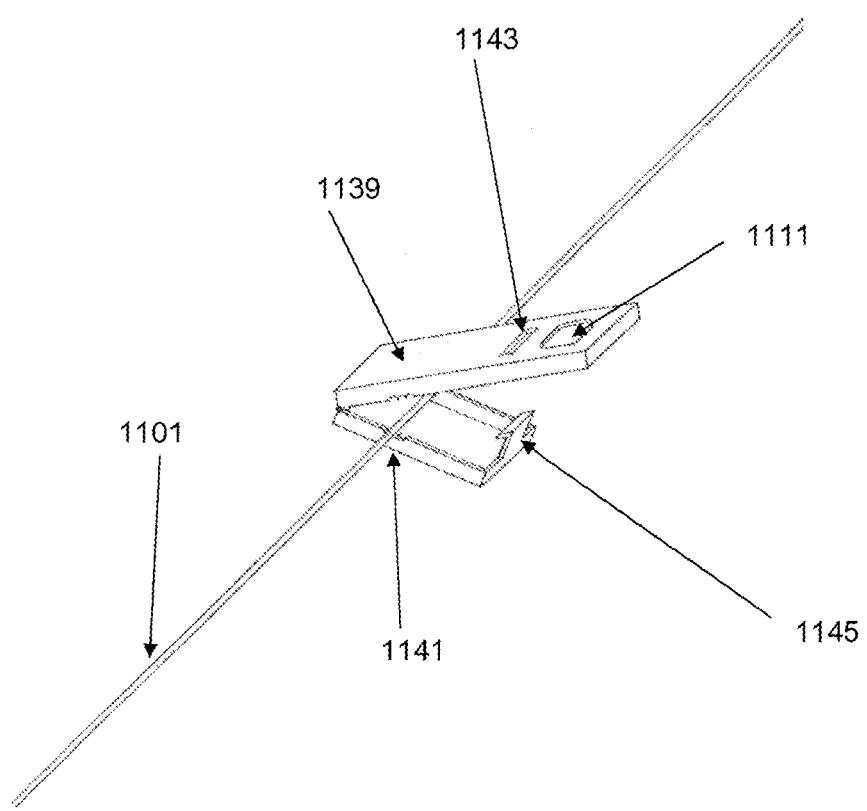
FIG. 7 is an arrangement according to a further embodiment of the invention.

FIG. 7 shows a cable positioning arrangement according to a further embodiment of the invention. The arrangement includes a flexible cord 1101 extended between two structures (not shown). A hinged peg 1139 is fastened around the cord 1101. The peg 1139 is shown in a partially opened state in FIG. 7 for the sake of clarity. The peg comprises a two parallel channels 1141 into which the cord 1101 is received. The channels 1141 are slightly smaller than the cord such that when the peg 1139 is closed, it is firmly held in position along the length of the cord 1101. The peg is held in a closed position by a barbed hook 1145 on the lower surface of the peg, engaging with a slot 1143 in the upper surface of the peg. The peg is repositionable along the cord by simply opening the peg, moving it, and closing it onto the cord at another location.

The upper surface of the peg has a countersunk hole 1111 through which a cable may be passed. Thus the arrangement in FIG. 7 provides another advantageous arrangement for positioning a cable. In particular, the flexible cord 1101 is easy to transport and easy to fix in position between the structures (relative to rigid noggins of the prior art). The peg 1139 enables the location of the hole 1111 (and thus the cable) to be established in a straightforward manner.

Whilst the present invention has been described and illustrated with reference to particular embodiments, it will be appreciated by those of ordinary skill in the art that the invention lends itself to many different variations not specifically illustrated herein. For example, the band need not necessarily include a hole; the hole may be created by insertion of the cable through the band. The flexible member may be supplied in a number of forms, including in a roll or in discrete lengths. The flexible member need not be elastic. The band need not necessarily have a continuous surface; for example the band may be of a mesh or lattice construction. The structures between which the band extends may be any structures (for example electrical apparatus, aerospace components, automotive components etc.) and not necessarily those in a building.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A cable positioning arrangement, comprising:
   a cable;
   two structures defining a gap, wherein each of the two structures is a part of a wall, a floor, or a ceiling of a building; and
   a flexible member having sufficient flexibility to be non-self-supporting, the flexible member provided in a roll, and unrolled to be elastically extended to span the gap between the two structures,
   wherein the flexible member has a length along a longitudinal direction, a width along a lateral direction, a depth along a depth direction, the length being greater than the width, and the width is greater than the depth, and
   the flexible member including a hole along the depth direction through which the cable passes thereby positioning the cable relative to the two structures,
   wherein the flexible member includes a reinforcement element running along at least one of the length or the width of the flexible member.

2. The cable positioning arrangement according to claim 1, wherein the flexible member is attached to at least one of the two structures by a fastener.

3. The cable positioning arrangement according to claim 1, wherein the flexible member is attached to at least one of the two structures by an adhesive.

4. The cable positioning arrangement according to claim 3, wherein the flexible member has an adhesive backing.

5. The cable positioning arrangement according to claim 1, wherein one of the two structures comprises a hook; and the flexible member is mounted on the hook.

6. The cable positioning arrangement according to claim 1, wherein a hook is mounted on one of the two structures.

7. The cable positioning arrangement according to claim 1, wherein the cable is of a first diameter,
   the hole is of a first size for receiving the cable, and
   the flexible member includes another hole of a second size for receiving another cable of a second diameter.

8. The cable positioning arrangement according to claim 7, wherein the hole is adjacent to the another hole, and the hole and the another hole are arranged across the width of the flexible member.

9. The cable positioning arrangement according to claim 1, wherein the flexible member comprises stiffening elements arranged to inhibit a reduction in the width of the flexible member when the flexible member is under tension.

10. A method of positioning a cable between two structures that are each a part of a wall, a floor, or a ceiling of a building, the method comprising the steps of:
    providing a roll of flexible band, the flexible band having a length along a longitudinal direction, a width along a lateral direction, and a depth along a depth direction, the length being greater than the width, and the width being greater than the depth, the flexible band having sufficient flexibility to be non-self-supporting;
    sizing a gap between the two structures;
    cutting across the width of the flexible band, and removing a piece of the flexible band from the roll;
    elastically extending the piece between the two structures such that the piece is under tension;
    passing the cable through a hole that is through the depth of the piece thereby positioning the cable relative to the two structures, and subsequent to the cable having been positioned; and
    cutting the piece of the flexible band at either side of the cable such that at least a part of the piece hangs down from at least one of the two structures; and making the hole in the flexible band after the step of elastically extending the piece between the two structures.

* * * * *